United States Patent
Hatakeyama et al.

(10) Patent No.: US 6,948,072 B2
(45) Date of Patent: Sep. 20, 2005

(54) INFORMATION PROCESSING DEVICE AND RECORD MEDIUM

(75) Inventors: Akiyuki Hatakeyama, Kanagawa (JP); Keiso Shimakawa, Kanagawa (JP); Tadayasu Hakamatani, Tokyo (JP); Makoto Tanaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 770 days.

(21) Appl. No.: 09/797,270

(22) Filed: Mar. 1, 2001

(65) Prior Publication Data

US 2001/0020256 A1 Sep. 6, 2001

(30) Foreign Application Priority Data

Mar. 3, 2000 (JP) ........................................ 2000-059532

(51) Int. Cl.⁷ .......................... G06F 11/30; G06F 12/14; H04L 9/00; H04L 9/32
(52) U.S. Cl. .............................. 713/200; 710/1; 710/36
(58) Field of Search ................................ 713/200, 176; 710/1, 36; 380/251, 189; 705/57; 717/175, 121

(56) References Cited

U.S. PATENT DOCUMENTS

| | | | |
|---|---|---|---|
| 4,817,140 A | 3/1989 | Chandra et al. | |
| 5,724,425 A | 3/1998 | Chang et al. | |
| 6,357,021 B1 * | 3/2002 | Kitagawa et al. | ............. 714/41 |
| 6,513,118 B1 * | 1/2003 | Iwamura | ..................... 713/176 |
| 6,707,774 B1 * | 3/2004 | Kuroda et al. | ........... 369/53.21 |

FOREIGN PATENT DOCUMENTS

| | | |
|---|---|---|
| EP | 0 773 490 A1 | 5/1997 |
| JP | 08-166879 | 6/1996 |
| JP | 2000-023089 | 1/2000 |
| WO | WO 99/56428 | 11/1999 |
| WO | WO 99/65579 | 12/1999 |

* cited by examiner

Primary Examiner—Gregory Morse
Assistant Examiner—Peter Poltorak
(74) Attorney, Agent, or Firm—Katten Muchin Rosenman LLP (57) ABSTRACT

An information processing device to solve the above-mentioned disadvantage according to the present invention comprises: information receipt part to receive a digital information from an external information record medium; first judgment part to judge whether the external information record medium is a medium which is readable and writable; second judgment part which judges whether a predetermined security processing is performed to the digital information to be received; and control part to control the information receipt part to refuse a receipt of the digital information which is judged that the medium is readable and writable by the first judgment part and a security processing is not performed by the second judgment part.

18 Claims, 4 Drawing Sheets

INFORMATION PROCESSING DEVICE AND RECORD MEDIUM

BACKGROUND OF THE INVENTION

1. Field of the Invention

The present invention relates to an information processing device which can secure a digital information with an execution format to activate an device fitted to its own device, for instance, a safety of a driver of the corresponding device.

2. Description of the Related Art

In general, when a device fitted to an information processing device is activated, it is necessary to load a driver (called as a "control program", hereinafter) only for the device on the main memory etc. of the information processing device. Usually, such a driver is recorded on a nonvolatile secondary record medium such as an accessible dedicated hard disk drive with a CPU of the information processing device, and is read therefrom at any time.

However, there is no means to hold a driver in the information processing device without such as the dedicated hard disk drive etc., for instance, an entertainment device such as a game machines. Therefore, when a new device for a function extension is added, it is necessary to load the driver for the new device from an external device on the main memory every time by some methods.

On the other hand, the memory card and other nonvolatile portable secondary record medium can be used in a recent entertainment device. Therefore, when a plurality of drivers are recorded on the memory card etc., it is released from annoyingness to load the driver from the external device every time when the device is added. However, in this case, the driver is easily copied by the third party through the memory card if some measure is not taken. It becomes a disadvantage when a driver of the device, which should secure a security is used. From the viewpoint which secures the safety of the operation of the device or the information processing device, a similar disadvantage is caused, when the digital information is loaded to activate the executable program file on the information processing device and the device other than the above-mentioned driver.

SUMMARY OF THE INVENTION

An object of the present invention is to provide an information processing device which can secure a safety of a digital information including a driver of a fitted device.

Another object of the present invention is to provide a record medium to achieve the above-mentioned information processing device on a general purpose computer.

An information processing device to solve the above-mentioned disadvantage according to the present invention comprises: information receipt means to receive a digital information from an external information record medium; first judgment means to judge whether said external information record medium is a medium which is readable and writable; second judgment means which judges whether a predetermined security processing is performed to the digital information to be received; and control means to control said information receipt means to refuse a receipt of the digital information which is judged that the medium is readable and writable by said first judgment means and a security processing is not performed by said second judgment means.

With this configuration, since only digital information to which at least security processing is performed can be received from a readable and writable medium among external information record media, the safety of the corresponding digital information is secured.

Another information processing device to solve the above-mentioned disadvantage according to the present invention comprises: information receipt means to receive a digital information from an external information record medium; first judgment means to judge whether said external information record medium is a medium which is distributed under a specific condition; second judgment means which judges whether a predetermined security processing is performed to the digital information to be received; and control means to control said information receipt means to refuse a receipt of the digital information which is judged that the medium is not distributed under the specific condition by said first judgment means and a security processing is not performed by said second judgment means.

Another information processing device to solve the above-mentioned disadvantage according to the present invention comprises: information transmission/receipt means to transmit/receive a digital information to/from an external information record medium; first judgment means to judge whether said external information record medium is a medium which is readable and writable or a medium which is distributed under a specific condition; second judgment means which judges whether a predetermined security processing is performed to the digital information to be received; and control means to control said information receipt means to refuse a receipt of the digital information which is judged that the medium is readable and writable or is not distributed under the specific condition by said first judgment means and a security processing is not performed by said second judgment means, and to urge writing the digital information, to which a security processing is performed on its own device, on said external information record medium.

The predetermined security processing is a processing which reversibly transforms the pattern of the digital information according to the predetermined rule, for instance, an encoding processing or a scramble processing in each information processing device. Usually, the above-mentioned digital information is the digital information with the execution format to activate the device fitted to the information corresponding processing device. The present invention becomes effective, when a holding area of the digital information with the execution format in the information processing device is a volatile information record area, in a word, the corresponding information processing device does not have the nonvolatile secondary record medium as the hard disk drive.

The above-mentioned information processing device can be achieved by a general-purpose computer and the following record medium.

A first record medium is a computer readable medium to which a program to form the following functions is recorded on a computer comprising a mechanism to receive the digital information from an external information record medium.

(1) A function to judge whether said external information record medium is a medium which is readable and writable;

(2) A function to judge whether a predetermined security processing is performed to a digital information to be received; and (3) A function to control said mechanism to refuse a receipt of the digital information which is judged that the medium is readable and writable, and is judged that the security processing is not performed.

A second record medium is a computer readable medium to which a program to form the following functions is recorded on a computer comprising a mechanism to receive the digital information from an external information record medium.

(1) A function to judge whether said external information record medium is a medium which is readable and writable;

(2) A function to judge whether a predetermined security processing is performed to a digital information to be received; and (3) A function to control said mechanism to refuse a receipt of the digital information which is judged that the medium is not distributed under the specific condition and is judged that the security processing is not performed.

A third record medium is a computer readable medium to which a program to form the following functions is recorded on a computer comprising a mechanism to receive the digital information from an external information record medium.

(1) A function to judge whether said external information record medium is a medium which is readable and writable;

(2) A function to judge whether a predetermined security processing is performed to a digital information to be received;

(3) A function to control said mechanism to refuse a receipt of the digital information which is judged that the medium is readable and writable or is not distributed under the specific condition and a security processing is not performed, and to urge writing the digital information, to which a security processing is performed on its own device, on said external information record medium; and (4) A function to urge writing the digital information to which the security processing is performed by said computer on the external information record medium.

The program recorded on each external record medium forms all or a part of said functions in cooperation with a control program (operating system, etc.), which is installed in said information processing device.

As is clear from the above-mentioned explanation, according to the present invention, the information processing device which can secure the safety of the digital information including the driver of the fitted device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE PREFERRED EMBODIMENT

Hereafter, an embodiment of the present invention will be explained referring to the drawings.

In the embodiment, an embodiment in which the present invention is applied to entertainment device which performs a creation of a computer graphic image for an entertainment and a reproduction of a sound which changes corresponding to a movement of the computer graphic image will be explained.

This entertainment device does not have a nonvolatile secondary record medium such as hard disk drives. That is, when a new device is added for a function extension, it is necessary to load a driver from an external device on a main memory (RAM) every time.

Figure 1:
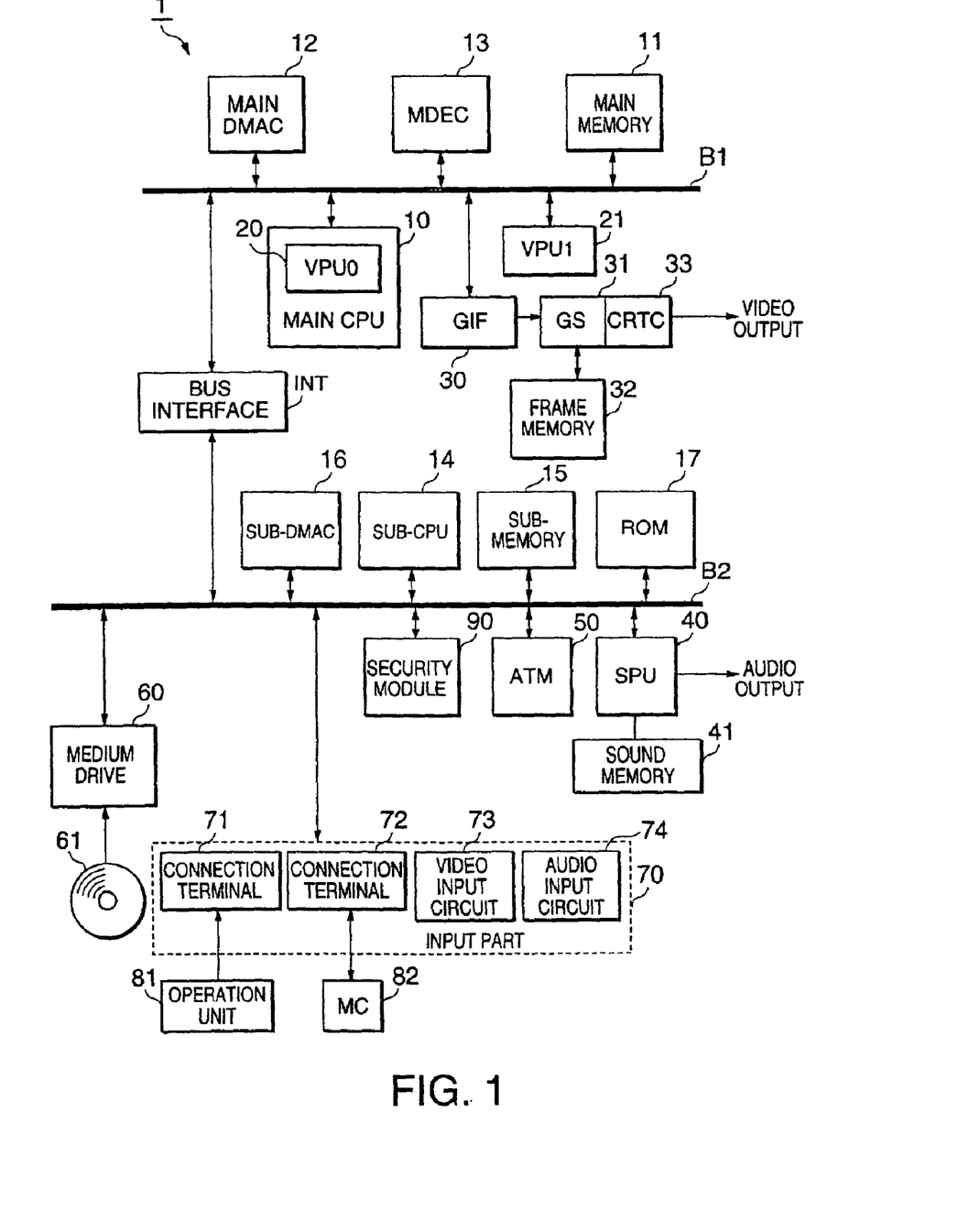
FIG. 1 is an internal configuration figure of an entertainment device to which the present invention is applied.

FIG. 1 is an internal configuration figure of the entertainment device according to the embodiment.

The entertainment device 1 has two buses of a main bus B1 and a sub-bus B2. The buses B1 and B2 are mutually connected or cut off through a bus interface INT. A main CPU 10 which is constructed by the microprocessor and the first vector processing device (VPU0, called as a "first VPU", hereinafter) 20 etc., a main memory 11 which is constructed by a RAM, a main DMAC (Direct Memory Access Controller) 12, an MPEG (Moving Picture Experts Group) decoder (MDEC) 13, a second vector processing device (VPU1, called as a "second VPU", hereinafter) 21, and a GIF (Graphical synthesizer Interface) 30 which functions as an arbiter of the first VPU 20 and the second VPU 21 are connected to the main bus B1, in addition, a drawing processing means 31 (Graphical synthesizer, called as a "GS", hereinafter) is connected thereto through the GIF 30. The CRTC (CRT Controller) 33, which creates a video output signal, is connected with the GS 31.

The main CPU 10 reads a start program from the ROM 17 on the sub-bus B2 through the bus interface INT when the entertainment device 1 is started, and executes the start program and operates the operating system. The main CPU 10 controls a medium drive 60, reads the application program and data from a medium 61, and memorizes it on the main memory 11. In addition, an atypical geometry processing (called as a "coordinate transformation processing", hereinafter) is performed to various data read from the medium 61, for instance, three-dimensional object data (coordinates value etc. of the top of the polygon (representative point)) which is constructed by a plurality of basic figures (polygon) in cooperation with the first VPU 20 and the display list which is the drawing element list is created.

The second VPU 21 performs a typical geometry processing, and creates the display list. The display list created with each of VPUs 20 and 21 is transferred to the GS 31 through the GIF 30. The GS 31 performing a rendering processing based on the display list (called as a "drawing processing", hereinafter). When the display list created by the first VPU 20 and the second VPU 21 is transferred to the GS 31, the GIF 30 basically arbitrates so as not to collide. The GIF 30 has a function, which sequentially checks these display lists from the one with higher priority, and transfers from the one of the upper to GS 31. When each of VPUs 20 and 21 creates the display list, information, which shows the priority of the display list, is usually described in the tag area.

The main DMAC 12 controls the DMA transfer for each circuit connected with the main bus B1 and controls the DMA transfer for each circuit connected with the sub-bus B2 according to the state of the bus interface INT. The MDEC 13 operates in parallel with the main CPU 10, and expands the data compressed by the MPEG (Moving Picture Experts Group) method or the JPEG (Joint Photographic Experts Group) method, etc.

On the other hand, a sub-CPU 14 constructed by the microprocessor etc., a sub-memory 15 constructed by the RAM, a sub-DMAC 16, a ROM 17 on which the program of the operating system etc. are memorized, a voice processing device 40 (SPU (sound processing unit)) which reads the sound data accumulated in sound memory 59 and outputs it as an audio output, a communication controller (ATM) 50 to transmit and receive data by the public line etc., a medium drive 60 to fit the medium 61 such as CD-ROM and DVD-ROM, and an input part 70 are connected with the sub-bus B2. The input part 70 has a connection terminal 71 to connect the operation unit 81, a connection terminal 72 to connect the memory card (CM) 82, a video input circuit 73 to the input image data from the external device, and an audio input circuit 74 to input the voice data from the external device.

The security module 90 is a processor which is specialized for the security processing, and is usually made to one chip and is exchangeable. The encoding processing is used as a security processing example in the embodiment.

That is the security module 90 encodes with a recorded key beforehand when the input data is a plaintext and the encoding instruction is received, on the other hand, when the input data is encoded, the decoding is performed with the above-mentioned key. In a word, a reversible transformation of the digital information is performed.

The security module 90 treats as a read only medium when the medium 61 fitted to the medium drive 60 is a CD-ROM and a DVD-ROM, on the other hand, treats as a medium which is the readable and writable when the memory card (MC) 82 is fitted to the connection terminal 72. When the memory card (MC) 82 is fitted, whether the recorded information is encoded or not is checked. The instruction is sent to the medium drive 60 to refuse the read from the memory card (MC) 82 if there is no encoded information. In this case, a read of the information recorded on the memory card (MC) is prohibited. The information read from the memory card MC is only a digital information encoded in a form which can be decoded with its own device.

The sub-CPU 14 executes various operations according to the program memorized on the ROM 17. The sub-DMAC 16 controls the DMA transfer etc. for each circuit connected with the sub-bus B2 only in a state that the bus interface INT cuts off the main bus B1 and the sub-bus B2.

An example when the driver is installed to the entertainment device 1 as constructed above will be specifically explained.

In the field of the entertainment, there is a tendency that a supply of the medium, which records the driver only for the device is limited and is distributed with a specific kind of medium. Usually, such a medium is a read only medium.

Then, in the following explanation, it is assumed that the read only device is free as a rule because there is no room to corrupt and a protection function of the driver is given to only a read of the driver from the writable medium. That is, an extension is enabled with securing a security as the entire device by limiting a houseroom of the program file with the execution format such as a driver to a medium which can be protected by a supply limitation, for example, a medium commonly called as a "BlueCD", and a CD-ROM, a DVD-ROM, and a memory card which record the encoded information.

Similarly, after the depository place of the program file of the execution format is limited, the start of the program from the device such as the memory cards protected beforehand (hereinafter, a device protected as described above is called as a "protection device") is enabled. It is constructed that a new device can be activated on the entertainment device 1 via the protection device.

These mechanisms can be achieves by the limitation of which only the encoded module can be loaded, regarding to loading the module from the device which does not exist when the product is developed, for instance, the network device.

The system constructed as described above, even if there is no recording device such as hard disk drives in the main body, the function extension of the entertainment device 1 can be performed by being concluded in the protected execution environment by way of the protection device to which the security is secured.

Since the new device added thus becomes a protected device, it comprises the extendibility of further loading another module based on the added device.

Next, the concrete example of the installation pattern of the driver will be explained based on FIG. 2 to FIG. 4.

Figure 2:
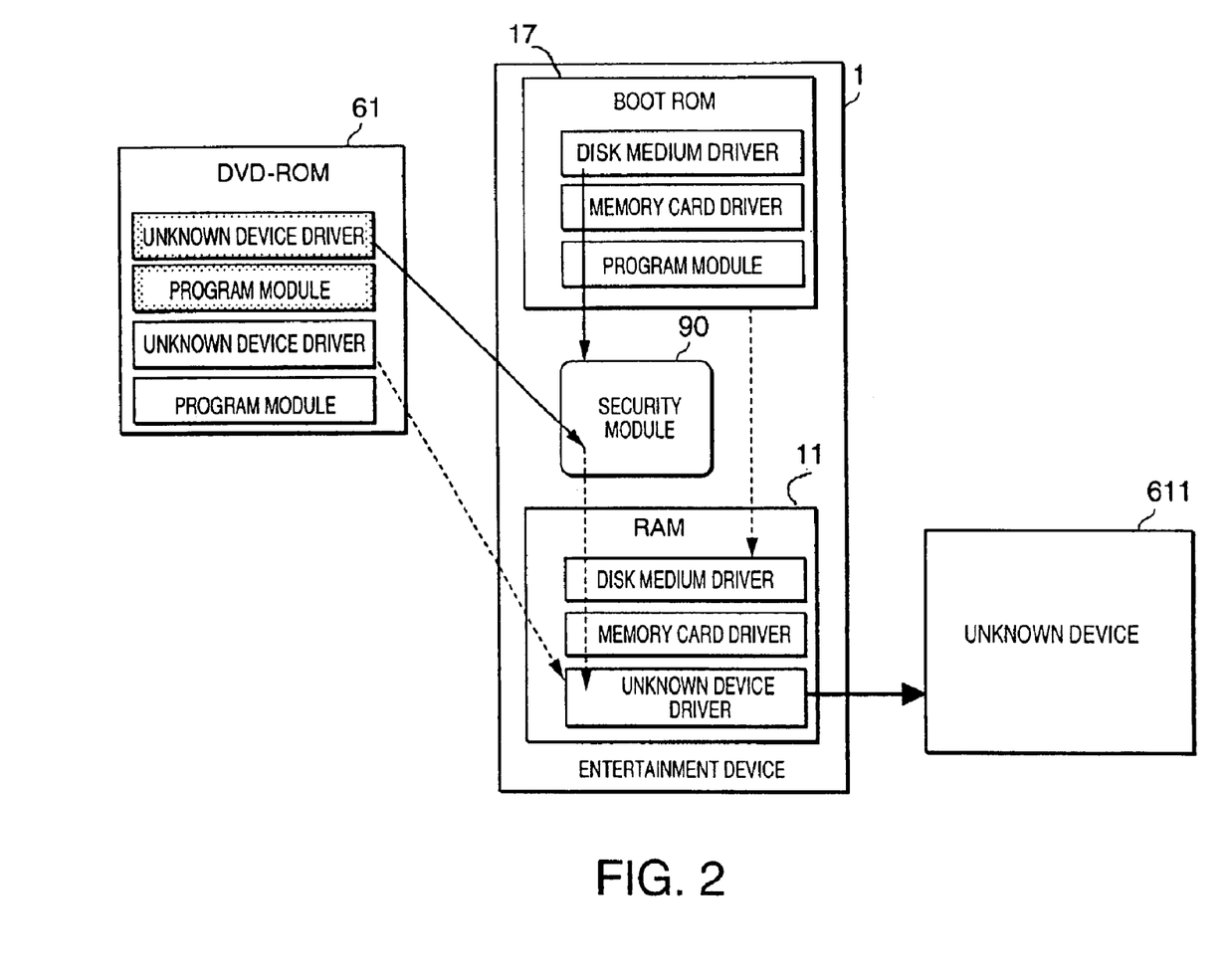
FIG. 2 is a figure, which shows a procedure when the driver of an unknown device recorded on the disk medium is installed to the entertainment device.

FIG. 2 is an example for installing the driver of the unknown device recorded on the disk medium to the entertainment device 1.

Though the entertainment device 1 is the same as that of FIG. 1, only the ROM 17 (hereinafter, called as a "boot ROM") which is referred at booting, the main memory 11 (hereinafter, called as merely a "RAM"), and a security module only 90 are extracted and shown. Though the driver and the program file, etc. corresponding to the device are loaded on the RAM 11, the content disappears when the power supply is turned off because of volatility. Since the driver and the program module recorded on the boot ROM 17 are recorded in a closed state in the device main body, usually, they are protected enough, and are possible to be loaded on the RAM 11 regardless of the presence of the encoding. The driver of the device, which should guarantee at least an operation, is recorded on the boot ROM 17.

In the example shown in the figure, a "disk medium drivers" in the boot ROM 17 assumes the driver of the device, which reads the medium (CD-ROM and DVD-ROM, etc.) distributed in a protected state by the supply limitation. It is possible to take and load both of the non-encoded driver and the encoded driver from such a medium on the RAM 11. A "memory card driver" is a driver to enable reading and writing from/to the above-mentioned the memory card (MC) 82. A "program module" is a program with the execution format file to activate the fitted device. These drivers may be encoded and held to the boot ROM 17, and may be decoded by the security module 90 and loaded on the RAM 11 when using, but it is assumed that the driver is not encoded in the following example.

The "disk medium driver" is installed from the boot ROM 17 on the RAM 11, when the driver of the unknown device recorded on the disk medium 61 (for example, DVD-ROM) are installed. As a result, reading from the disk medium becomes possible. Since the disk medium in this case is the medium protected by the supply limitation, both of the non-encoded driver and the encoded driver can be loaded on the RAM 11. Then, the non-encoded driver of the unknown device is loaded on the RAM 11. As a result, the unknown device 611 is activated and can be used in the entertainment device 1.

Figure 3:
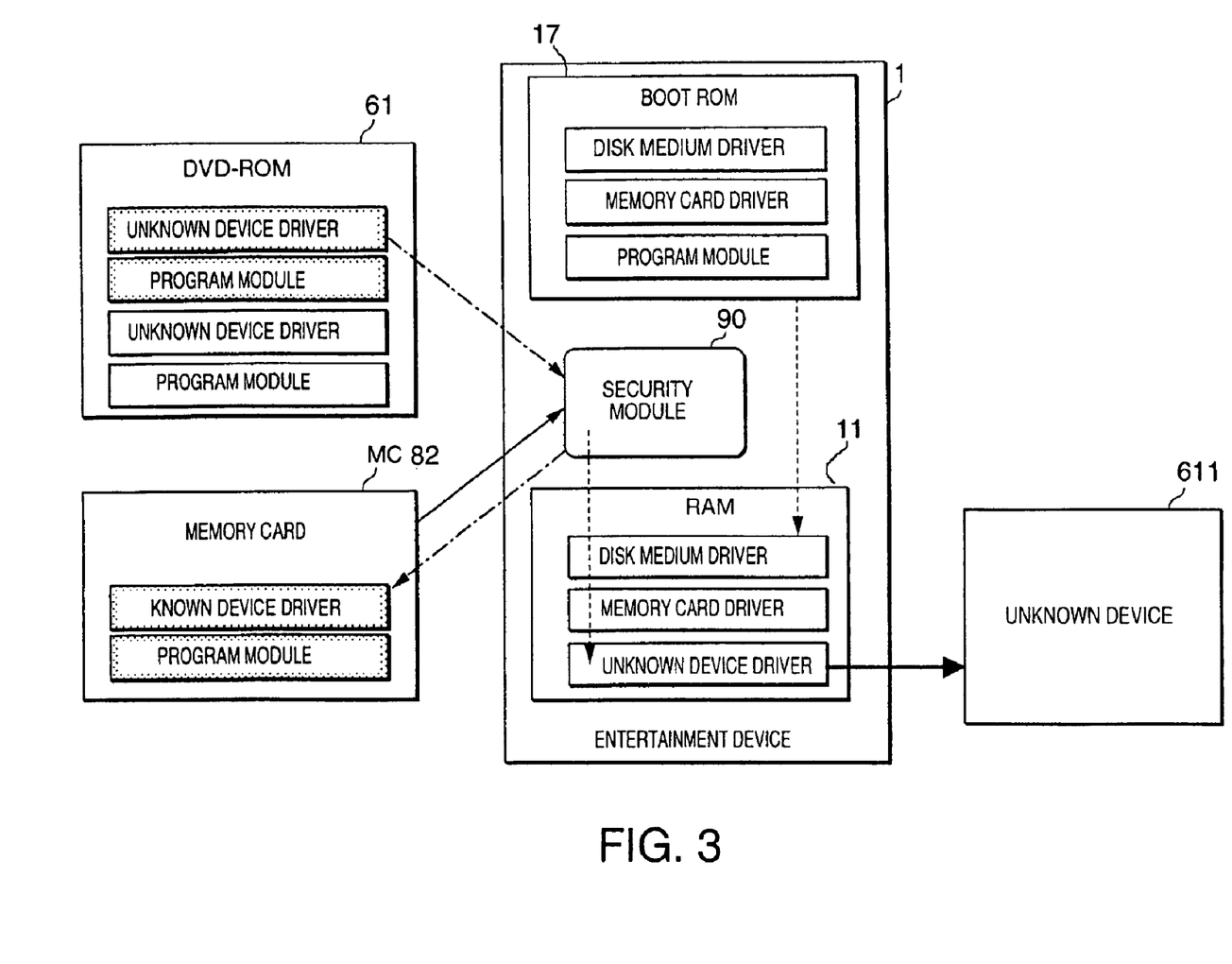
FIG. 3 is a figure which shows a procedure when an unknown device driver recorded on the disk medium is recorded on the memory card, thereafter the unknown device driver is installed from the memory card to the entertainment device.

FIG. 3 is an example when an unknown device driver recorded on the disk medium (DVD-ROM) 61 is recorded on the memory card (MC) 82, and then, the unknown device driver is loaded from the memory card (MC) 82 on the RAM 11. Since the memory card (MC) 82 is the medium which can be read and written, only the encoded driver can be read therefrom. Then, when the unknown device driver is recorded on the memory card (MC) 82, the security module 90 records in the encoded form.

The unknown device driver from the memory card (MC) 82 is decoded by the security module 90, and the decoded device driver is loaded and read on the RAM 11. As a result, it becomes possible to use the unknown device 611 in the entertainment device 1.

Figure 4:
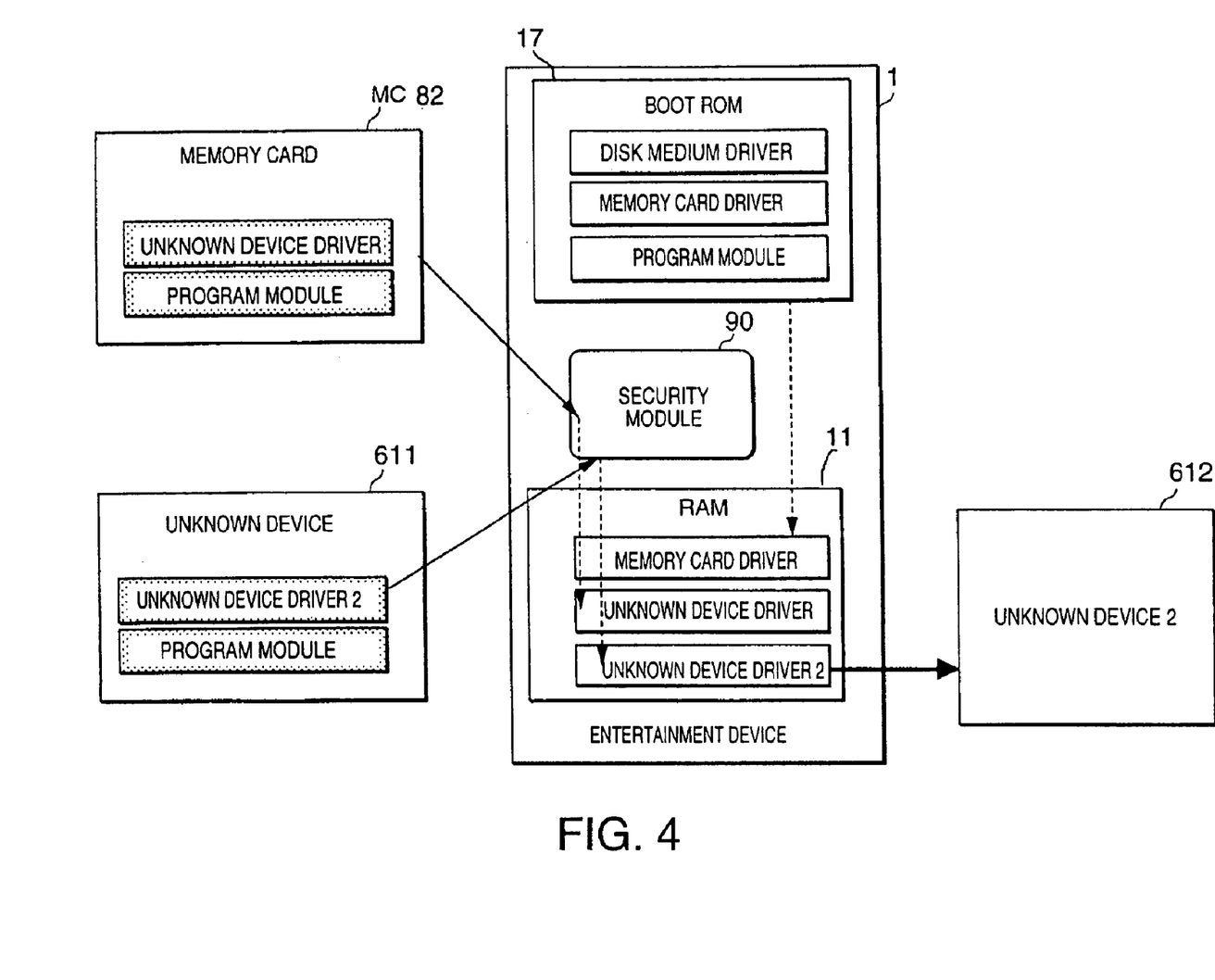
FIG. 4 is a figure which shows a procedure when these drivers are installed to the entertainment device when an unknown device driver is recorded on the memory card, and other unknown device drivers are recorded on the unknown device.

FIG. 4 is an example when the driver of the unknown device 611 is recorded on the memory card (MC) 82, and the other unknown device driver is recorded on the unknown device 611. Each driver is recorded by the protected pattern by encoding.

First, a "memory card driver" is loaded from the boot ROM 17 on the RAM 11. Since the encoded unknown device driver can be read from the memory card (MC) 82, the device driver is decoded by the security module 90 and is loaded on the RAM 11. As a result, it becomes possible to use the unknown device 611 with the entertainment device 1. Though it is uncertain whether the unknown device 611 is readable and writable medium, at least the unknown device driver 2 protected by encoding can be read. Then, this unknown device driver 2 is decoded by the security module 90, and the device driver is loaded on the RAM 11. As a result, it becomes possible to use the memory card (MC) 82 and the unknown devices 611 and 612 at the same time with the entertainment device.

As described above, since it becomes possible to load only at least encoded driver on the RAM 11 from the readable and writable medium among the external information record media, the safety of the driver is secured.

Though it is assumed whether the information record medium which records the driver is the medium which can read and write to be one judgment reference in the above embodiment, whether the medium is distributed under a specific condition, or whether the medium is distributed under a specific condition and can be read and written may be the judgment reference. The medium etc., which recorded a specific character and the sign when the supply is limited, are exemplified as an example of the medium distributed by a specific condition. In this case, it can be easily achieved by checking the presence of the character etc. when the medium is fitted to the medium drive 60 or the connection terminal 72. Or, the medium, which installs the program with the execution format, which automatically may access some information to the entertainment device 1 when the medium is fitted, is acceptable.

The point to load only the encoded driver on the ROM when it is judged that medium is not distributed under a specific condition, is similar to the above-mentioned case.

The driver can be protected by not only encoding like the above-mentioned but also the scramble processing and other security processing. In addition, a program file with the execution format and a secret digital information can be protected by the technique same as the case of the above-mentioned driver.

The present invention is not limited to the application to the entertainment device, since the present invention has a feature to refuse the receipt of the digital information as long as the predetermined security processing is not performed when the digital information is received from the external information record medium, when the medium to which the information can be written by the third party, on the other hand, to perform the mechanism that the above-mentioned security processing is performed to the digital information to be protected and the digital information is recorded on the external information record medium.

Though the above-mentioned security module 90 constructed with the processor made a chip in the above-mentioned example, it is also possible to be achieved in software by executing the program recorded on the medium, which is fitted to the medium driver 60.

In addition, various functions to include the above-mentioned security module 90 can be achieved on a general-purpose computer. In this case, it records the program to achieve the following function in computer readable information record medium, this program is single, or, in cooperation with the operation system of this program and the corresponding computer, is executed by the computer in ex post.

(1) A function to judge whether the external information record medium is the medium, which is readable and writable or not and/or whether the external information record medium is the medium distributed under a specific condition;

(2) A function to judge whether a predetermined security processing is performed to the digital information to be received;

(3) A function to control a receipt mechanism of the digital information so that it is judged the medium is not distributed under a specific condition when the medium is readable and writable and the security processing is not performed, and a receipt of the digital information is refused when it is judged the medium is not distributed under a specific condition and the security processing is not performed; and (4) A function to urge writing the digital information to which the security processing is performed on the computer side on the external information record medium.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing device comprising:
information receipt means to receive digital information from an external information storage medium;
first judgment means to judge whether said external information storage medium is a medium which is readable and writable;
second judgment means which judges whether a predetermined security processing is performed to the digital information to be received;
control means to control said information receipt means to refuse a receipt of the digital information when said external information storage medium is judged by said first judgment means as readable and writable and by said second judgment means to determine that the security processing is not performed; and connector means for connecting a removable storage medium which is readable and writable, wherein as to digital information for which it is judged by said second judgment means that encoding processing is performed, said control means decodes the encoded information, and as to digital information which is read from said external information medium for which it is judged by said first judgment means that said external information medium is not readable and writable and for which it is judged by said second judgment means that encoding processing is not performed, said control means encodes the digital information and prompts the information processing device to write the encoded digital information on said removable medium via said connector means.

2. The information processing device according to claim 1, wherein said security processing is a processing which reversibly transforms a pattern of the digital information according to a predetermined rule.

3. The information processing device according to claim 1, wherein said digital information is a digital information with an execution format to activate a device.

4. The information processing device according to claim 3, wherein a holding area of the digital information with said execution format is held in a volatile memory.

5. An information processing device comprising:

information receipt means to receive a digital information from an external information storage medium;

first judgment means to judge whether said external information storage medium is a medium which is distributed under a specific condition;

second judgment means which judges whether a predetermined security processing is performed to the digital information to be received;

control means to control said information receipt means to refuse a receipt of the digital information which is judged that the medium is not distributed under the specific condition by said first judgment means and a security processing is not performed by said second judgment means; and connector means for connecting a removable storage medium which is readable and writable, wherein as to digital information for which it is judged by said second judgment means that the predetermined security processing is performed, said control allows the receipt of the digital information, and as to digital information which is read from said external information medium for which it is judged by said first judgment means that said external information medium is distributed under the specific condition and for which it is judged by said second judgment means that the predetermined security processing is not performed, said control means encodes the digital information and prompts the information processing device to write the encoded digital information on said removable medium via said connector means.

6. The information processing device according to claim 5, wherein said security processing is a processing which reversibly transforms a pattern of the digital information according to a predetermined rule.

7. The information processing device according to claim 5, wherein said digital information is a digital information with an execution format to activate a device.

8. The information processing device according to claim 7, wherein a holding area of the digital information with said execution format is held in a volatile memory.

9. An information processing device comprising:

information transmission/receipt means to transmit/receive a digital information to/from an external information storage medium;

first judgment means to judge whether said external information storage medium is a medium which is readable and writable or a medium which is distributed under a specific condition;

second judgment means which judges whether a predetermined security processing is performed to the digital information to be received; and control means to control said information receipt means to refuse a receipt of the digital information when said external information storage medium is judged by said first judgment means as readable and writable or as being distributed under the specific condition by said first judgment means, and by said second judgment means to determine that the security processing is not performed and to prompt writing the digital information, to which a security processing is performed, on said external information storage medium; and connector means for connecting a removable storage medium which is readable and writable, wherein as to digital information for which it is judged by said second judgment means that security processing is performed, said control means decodes the encoded information, and as to digital information which is read from said external information medium for which it is judged by said first judgment means that said external information medium is not readable and writable or as being distributed under the specific condition, and for which it is judged by said second judgment means that security processing is not performed, said control means encodes the digital information and prompts the information processing device to write the encoded digital information on said removable medium via said connector means.

10. The information processing device according to claim 9, wherein said security processing is a processing which reversibly transforms a pattern of the digital information according to a predetermined rule.

11. The information processing device according to claim 9, wherein said digital information is digital information with an execution format to activate a device.

12. The information processing device according to claim 11, wherein a holding area of the digital information with said execution format is held in a volatile memory.

13. A computer readable storage medium comprising a program providing functionality to perform the steps of:

(1) judging whether an external information storage medium is a medium which is readable and writable;

(2) judging whether a predetermined security processing is performed to a digital information to be received; and (3) controlling a mechanism for receiving digital information to refuse a receipt of the digital information which is judged that the medium is readable and writable and is judged that the security processing is not performed, on a computer which comprises said mechanism to receive the digital information from said external information storage medium;

further comprising the steps of:

(4) connecting a removable storage medium which is readable and writable via a connecting means:

(5) for digital information for which it is judged that security processing is performed, decoding the encoded information; and (6) for digital information for which it is judged that said external information storage medium is not readable and writable and for which it is judged that security processing is not performed, encoding and writing the encoded digital information on said removable medium via said connector means.

14. The storage medium according to claim 13, wherein said program performs all or a part of said functionality in cooperation with a control program which is installed in an information processing device comprising said computer and said storage medium.

15. A computer readable storage medium comprising a program providing functionality to perform the steps of:

(1) judging whether an external information storage medium is a medium which is readable and writable;

(2) judging whether a predetermined security processing is performed to a digital information to be received; and (3) controlling a mechanism for receiving digital information to refuse a receipt of the digital information which is judged that the medium is readable and writable and is judged that the security processing is not performed, on a computer which comprises said mechanism to receive the digital information from said external information storage medium;

further comprising the steps of:

(4) connecting a removable storage medium which is readable and writable via a connecting means:

(5) for digital information for which it is judged that security processing is performed, decoding the encoded information; and (6) for digital information for which it is judged that said external information storage medium is not readable and writable and for which it is judged that security processing is not performed, encoding and writing the encoded digital information on said removable medium via said connector means.

16. The storage medium according to claim 15, wherein said program performs all or a part of said functionality in cooperation with a control program which is installed in an information processing device comprising said computer and said storage medium.

17. A computer readable storage medium comprising a program providing functionality to perform the steps of:

(1) judging whether an external information storage medium is a medium which is readable and writable;

(2) judging whether a predetermined security processing is performed to a digital information to be received;

(3) controlling a mechanism for receiving digital information to refuse a receipt of the digital information when said external information storage medium is judged as readable and writable or as not being distributed under the specific condition and it is judged that said security processing is not performed, and to prompt writing the digital information, to which a security processing is performed, on said external information storage medium; and (4) writing the digital information to which the security processing is performed by said computer on said external information storage medium, on a computer which comprises said mechanism to receive the digital information from said external information storage medium;

further comprising the steps of:

(4) connecting a removable storage medium which is readable and writable via a connecting means:

(5) for digital information for which it is judged that security processing is performed, decoding the encoded information; and (6) for digital information for which it is judged that said external information storage medium is not readable and writable and for which it is judged that security processing is not performed, encoding and writing the encoded digital information on said removable medium via said connector means.

18. The storage medium according to claim 17, wherein said program performs all or a part of said functionality in cooperation with a control program which is installed in an information processing device comprising said computer and said storage medium.

* * * * *